Figure 1:
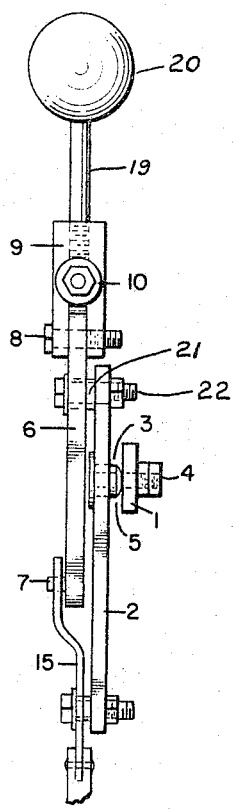
Figure 2:
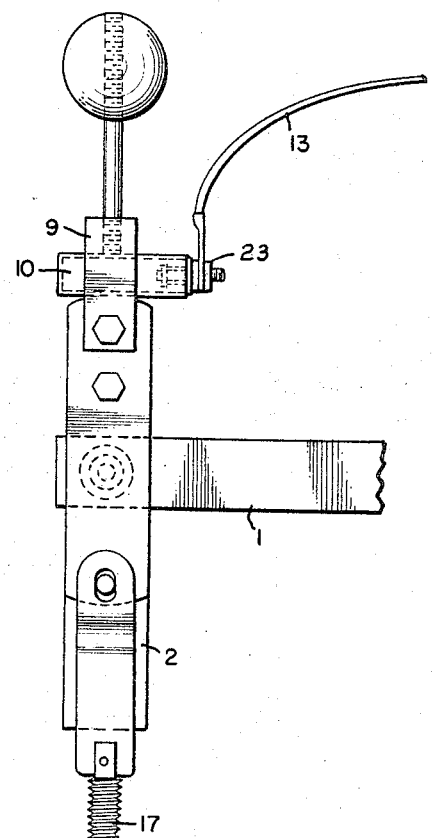
Figure 3:
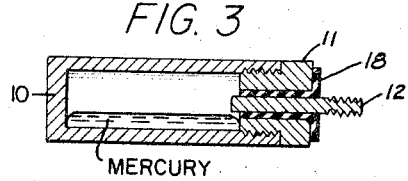

July 11, 1967 W. E. CUNNINGHAM 3,330,921
AUTOMATIC MOMENTUM-ACTUATED SWITCH MECHANISM
Filed March 21, 1966

INVENTOR
WILLIAM E. CUNNINGHAM

United States Patent Office 3,330,921
Patented July 11, 1967

3,330,921
AUTOMATIC MOMENTUM-ACTUATED SWITCH MECHANISM
William Everett Cunningham, 2101 Emmons Road, Cambria, Calif. 93428
Filed Mar. 21, 1966, Ser. No. 538,154
6 Claims. (Cl. 200—61.48)

My invention relates to a new type of switch mechanism that will be of great value when used in connection with caution or warning lights to warn of deceleration and particularly to an automatic momentum-actuated switch mechanism to be used in connection with amber-colored lights on the rear of a mobile vehicle to warn of a sudden loss of forward motion of the said vehicle, in which the momentum of a pair of weights properly placed actuates a mercury switch to close the electrical circuit to said lights if and when deceleration results in loss of momentum of the said mobile vehicle as a whole.

With the rapid increase in the number of automobiles, trucks and buses on our improved highways, more and more attention is being given to the problem of traffic safety. Frequently unobserved deceleration of one rapidly-moving vehicle causes trouble for the operators of those following, and many people are injured in ensuing rear-end collisions.

An object of my invention is to provide an inexpensive automatic switch mechanism that will automatically close the circuit to electric caution lights on the rear of a mobile vehicle when the said vehicle suddenly loses forward speed as when deceleration takes place, without any conscious effort on the part of the operator of the said vehicle.

Another object of my invention is to provide an automatic switch mechanism which, after having closed the electrical circuit to the caution lights with deceleration of the moving vehicle, will again automatically break the same electrical circuit as soon as deceleration ceases or acceleration begins.

Another further object of my invention is to provide an automatic switch mechanism for caution lights on the rear of a moving vehicle that will automatically close and open the electrical circuit to the said lights without any conscious effort on the part of the operator of the said vehicle at times when deceleration is sudden without the application of brakes which would turn on the red stop lights.

Another further objective of my invention is to provide an inexpensive switch mechanism for the purpose stated before that could be placed on new automobiles and other mobile vehicles by the manufacturers without any increase in price or that could be put on existing vehicles by the owner at a very small cost.

Another further objective of my invention is to provide an additional safety device for mobile vehicles that will result in saving many lives, critical injuries, and thousands of dollars each year.

In the accompanying drawing I show the novel features of my invention which I believe to be characteristic both as to its manner of organization and mode of operation and which will be better understood from the following description when read in conjunction with the following drawing in which:

FIGURE I is a front view of the switch mechanism embodying a mercury switch;
FIGURE II is a side view of the same; and
FIGURE III is a sectional view of the switch thus employed.

Referring now to the drawings in which the same reference numerals indicate the same elements, the mounting bracket 1 of any suitable material serves as a support and attachment to the vehicle and varies according to the need in the specific location. The primary body of the mechanism 2 is fitted with a bushing 3 at a point approximately ⅓ of its length from the upper end through which a bolt 4 attaches said body to the support bracket and serves as a transverse pivot on which the body swings to maintain a vertical position with reference to the ground regardless of the attitude of the vehicle. Between the said bushing and the said support bracket is a spring washer 5 which maintains a certain amount of friction between the two parts which is adjustable by means of the two nuts on the end of the said bolt.

Attached to the upper end of this main body 2 is a movable arm 6 similarly fitted with a bushing 21 through which a bolt 22 attaches it to the top end of the said main body 2 and serves as a pivot for the said movable arm the lower end of which is fitted with a hardened pin 7 protruding to the outside and the upper end with a hole through which a bolt 8 snugly attaches a switch clamp 9 that may be adjusted to obtain proper positioning of the switch 10. Attached to the top of the said switch clamp is an externally threaded rod 19 on the distal end of which is a spherical weight 20 of medium weight material threaded internally to accommodate said externally threaded rod and provide for adjustment of the distance from the said weight to the said clamp to accomplish proper functioning of the said weight.

The said switch 10 is a hollow brass cylinder permanently sealed at the rear end and fitted with a screw-in cap 11 at its front end through which is firmly inserted an insulated 18 electrode 12 that has its inner end exposed and the outer end fitted with two nuts 23 between which the terminal of the ground wire 13 of the lighting system is secured. Within the said cylindrical switch is a small amount of mercury the top level of which is below the exposed end of the said electrode when the said switch is in the normal position but comes in contact with the said end of the electrode when the switch is in its tipped position, the tipping being caused by the momentum of the said weight in conjunction with the momentum of a second weight 14 to be described later.

If so desired by the manufacturer, the said hollow brass cylinder of the said switch 10 could have within it a brass ball in place of the small amount of mercury. The ball would roll forward and make contact with the said bare tip of the said electrode when the switch is tipped by the momentum of the said weight in conjunction with the momentum of a second weight 14 to be described later.

Attached to the lower end of the said main body 2 in a manner similar to the attachment of the upper arm 6 is a second movable arm 15 shaped in such a way that a suitable hole in the top end of this said arm will accommodate the said pin 7 that protrudes from the outer face of the lower end of the said top movable arm 6 so that any back and forth movement of the top end of the said lower arm 15 will initiate movement in the upper movable arm 6.

Suspended to the lower end of the said lower movable arm 15 on a bolt 16 of proper length is a heavier weight 14 mentioned above, that is permitted to hang in a perpendicular position when the vehicle rotates a little about its longitudinal axis by means of a short length of coiled extension spring 17 inserted between the lower part of the arm 15 and the bolt 16 the insertion being accomplished by threading the spring onto the respective ends of the two parts.

The entire mechanism should be made of a light, non-corrosive material such as aluminum or plastic with the exception of the switch 10 which should be of brass, and insulation, and the lower weight 14 which should be of lead or iron.

The operation of the switch mechanism is as follows:
As long as the moving vehicle is maintaining a fixed speed, the weights will keep the mechanism in a position perpendicular to the ground regardless of the attitude of the vehicle, and the switch cylinder will be in the normal horizontal position with electrical contact open. But when the vehicle loses momentum suddenly because of deceleration, the momentum of the two weights working together through the linkage described combined with that of the mercury in the cylinder tips the front of the cylinder downward bringing the level of the mercury in contact with the exposed inner end of the brass electrode thus closing the ground circuit of the electrical system of the caution lights and keeping it closed as long as deceleration continues. However, as soon as a fixed speed is again reached or acceleration begins, the weights lose their excess momentum thus enabling the mechanism to become stabilized in the normal position again. The action is completely automatic, requiring no effort on the part of the operator of the vehicle. A simple automatic switch of this type used in connection with amber caution lights on the rear of mobile vehicles will be of great value in preventing rear-end collisions due to sudden deceleration without the application of brakes to turn on the red stop lights.

While I have described and illustrated particular embodiments of my invention, modifications which are within my invention may occur to those skilled in the art; so I desire that it be understood, therefore, that all such modifications are included within the scope of the claims annexed to and forming a part of this application.

What I claim as new and desire to secure by Letters Patent of the United States is:

1. An automatic momentum-actuated switch mechanism to be used in connection with amber caution lights on the rear of a mobile vehicle to close the electrical circuit to said lights when deceleration of the said mobile vehicle occurs comprising a mounting bracket, a primary elongated movable body with a movable arm pivoted at each end of said body, the upper end of one of said arms being fitted at its upper end with an adjustable switch clamp holding a switch, said switch comprising a hollow brass cylinder permanently sealed at the rear end and fitted with a screw-in plug or cap in the front end through which is snugly inserted an insulated brass electrode the outer bare end of which receives the ground wire of the caution light electrical system while the bare tip of the inner end serves as the breaker point of the said switch, and containing within a movable contactor which acts to close said electrical circuit, and a threaded rod carried by free end of said clamp which bears at its upper end a weight adjustable as to its distance above the said switch clamp and switch to regulate the effect of the momentum of the said weight in operating said switch mechanism, the lower end of the said upper arm being articulately connected to the upper end of said lower arm by a pin protruding from the inner face of the said arm into a slot formed in the other said arm and a heavier weight flexibly suspended from the lower end of the said lower arm which keeps the mechanism in a vertical position and provides momentum which in conjunction with that of the upper said weight and that of the movable contactor in the said switch tips the said switch thus bringing the said movable contactor in contact with the bare inner end of the said electrode to close the said electrical circuit.

2. An automatic momentum-actuated switch mechanism in accordance with claim 1 in which the said movable primary body and the said arms are pivoted to restrict the swing of each to a plane parallel to the longitudinal axis of the mobile vehicle equipped with said mechanism and the heavier lower weight flexibly suspended by the insertion of a coil spring between the said heavier weight and the said lower end of the said lower arm.

3. An automatic momentum-actuated switch mechanism in accordance with claim 1 wherein said weights are so arranged that deceleration of the said mobile vehicle causes the momentum of the said weights to tilt said switch so that the said contactor within said switch moves to close the said electrical circuit.

4. An automatic momentum-actuated switch mechanism in accordance with claim 1 wherein said movable contactor in said brass cylinder is a brass ball which closes the said electrical circuit when said cylinder is tipped forward and downward from the effect of the momentum of said weights due to deceleration of said mobile vehicle.

5. An automatic momentum-actuated switch mechanism for closing the electrical circuit to amber caution lights on the rear of a mobile vehicle when deceleration of said vehicle results in a sudden slowing of its forward motion comprising two elongated arms, one pivoted at each end of an elongated primary body, said body being pivoted to a mounting bracket, means articulately joining the adjacent ends of the said arms with each other, the upper end of the upper said arm being fitted with an adjustable clamp holding a switch comprising a hollow brass cylinder permanently sealed at its rear end and fitted with a screw-in plug at the front end through which is snugly fitted an insulated brass electrode the outer bare end of which receives the ground wire of the said caution lights electrical system while the bare tip of the inner end serves as the breaker point of the said switch, and containing within a small amount of mercury adapted to close said electrical circuit, said upper end also being fitted wth a threaded rod which bears at its upper end a weight adjustable as to its distance above the said switch clamp and switch to regulate the effect of the momentum of the said weight in the operation of the switch mechanism, a heavier weight flexibly suspended from the lower end of the lower of the two said elongated arms which keeps the mechanism in a vertical position and provides momentum which in conjunction with that of the upper said weight and that of the mercury in the said switch cylinder tips the said switch thus bringing the said mercury in contact with the said breaker point to close the said electrical circuit to turn on the amber caution lights.

6. An automatic momentum-actuated switch mechanism to be used in connection with the electrical circuit to amber-colored lights on the rear of a mobile vehicle to warn of deceleration of said vehicle comprising a mounting bracket, a primary body pivotally mounted on said bracket, at least two movable arms pivotally carried by said body and having overlapping ends, means coupling said overlapping ends for articulation, weights of different masses connected to the distal ends of the said arms to furnish momentum to actuate said mechanism, means connecting between one of said arms and one of said weights for keeping said mechanism in a vertical position, and a switch mounted on the one said arm to close said electrical circuit when the momentum of said weights tips the said switch as a result of deceleration of said mobile vehicle which results in a sudden slowing of forward motion of the said mobile vehicle.

No references cited.

BERNARD A. GILHEANY, *Primary Examiner.*

J. J. BAKER, H. B. GILSON, *Assistant Examiners.*